United States Patent [19]
Grutzner et al.

[11] Patent Number: 5,239,262
[45] Date of Patent: Aug. 24, 1993

[54] INTEGRATED CIRCUIT CHIP WITH BUILT-IN SELF-TEST FOR LOGIC FAULT DETECTION

[75] Inventors: Matthias Grutzner, Stuttgart; Cordt W. Starke, Weil der Stadt, both of Fed. Rep. of Germany

[73] Assignee: International Business Machines Corporation, Armonk, N.Y.

[21] Appl. No.: 839,418

[22] Filed: Feb. 21, 1992

[30] Foreign Application Priority Data

Feb. 21, 1991 [EP] European Pat. Off. ............ 91102482

[51] Int. Cl.⁵ .............................................. G01R 31/28
[52] U.S. Cl. ................... 324/158 R; 371/22.5; 371/27
[58] Field of Search .......... 324/33.1, 158 R; 371/27, 21.3, 22.5; 364/717, 717.5

[56] References Cited

U.S. PATENT DOCUMENTS

| | | | |
|---|---|---|---|
| 3,719,885 | 3/1973 | Carpenter et al. | 371/27 |
| 4,718,065 | 1/1988 | Boyle et al. | 371/27 |
| 4,852,096 | 7/1989 | Brinkman | 371/27 |
| 5,043,988 | 8/1991 | Brglez et al. | 364/717 |

FOREIGN PATENT DOCUMENTS

| | | | |
|---|---|---|---|
| 0206287 | 12/1986 | European Pat. Off. | |
| 0001578 | 1/1985 | Japan | 371/27 |

OTHER PUBLICATIONS

"Test Generation Using an Efficient Weight Generator", by IBM, IBM Tech. Disc. Bull, vol. 32, #4B, Sep. 1989, pp. 429-433.

"Weighted Random Pattern Generation for Self-Test" IBM TDB, vol. 32, No. 10A, Mar. 1990, pp. 140-143.

"Design for Testability and Diagnosis in a VLSI CMOS System/370 Processor", Starke, pp. 355-362, IBM J. Res. Develop. vol. 34, No. 2/3, Mar./May 1990.

"Low-Cost LTesting of High-Density Logic Components" Bassett et al, IEEE, Apr. 1990, pp. 15-28.

"A New Procedure for Weighted Random Built-in Self-Test" Muradali et al, IEEE, Sep. 1990, pp. 660-669.

"Hardware-Based Weighted Random Pattern Generation for Boundary Scan" Brglez et al, IEEE Aug. 1989, pp. 264-274.

Primary Examiner—Ernest F. Karlsen
Attorney, Agent, or Firm—William H. Steinberg

[57] ABSTRACT

An integrated circuit chip with built-in self-test for logic fault detection is described which comprises a number of combinational logic circuits and a number of shift register latches. The combinational logic circuits are coupled via the shift register latches and the shift register latches are connected to form test scan paths. Test weights are created and combined with test patterns and are then applied to the test scan paths of the integrated circuit chip. In contrast to the prior art where the test weights are taken out of a weight storage table, the invention generates the test weights with the help of a so-called "finite state machine", i.e. with a circuit which creates a finite number of test weights without storing them. Therefore, no weight storage table or the like is necessary and the whole tester can be incorporated on the chip.

20 Claims, 2 Drawing Sheets

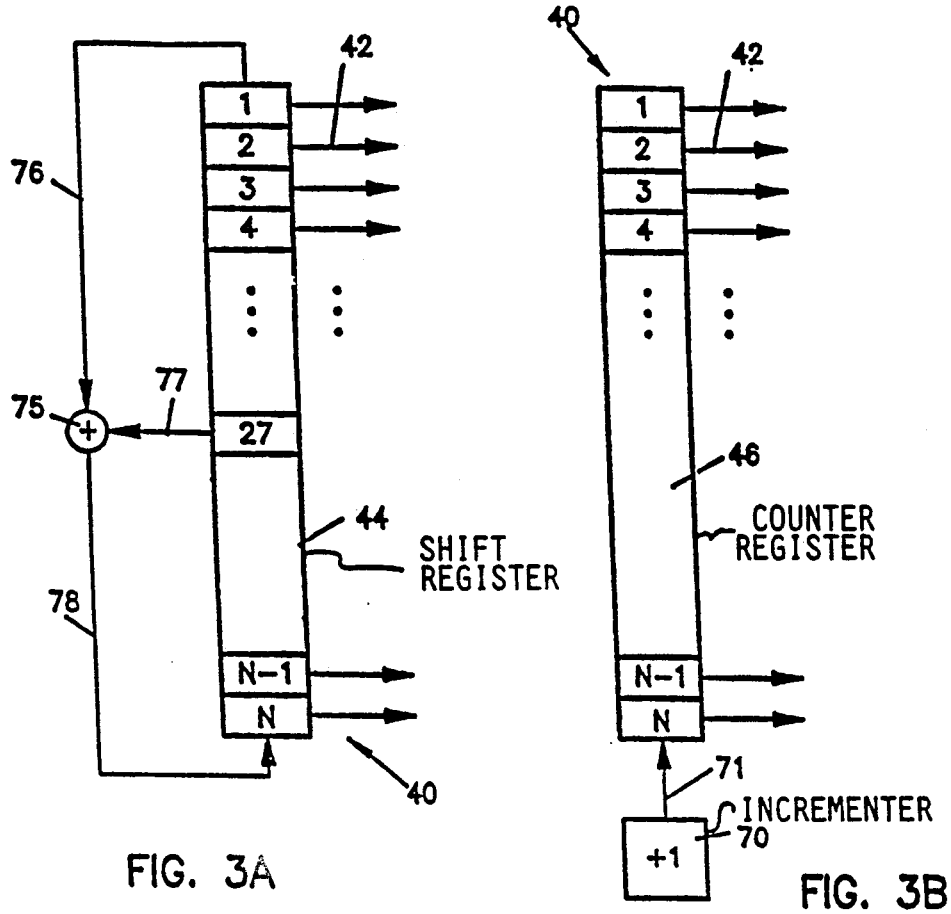
FIG. 3A
FIG. 3B
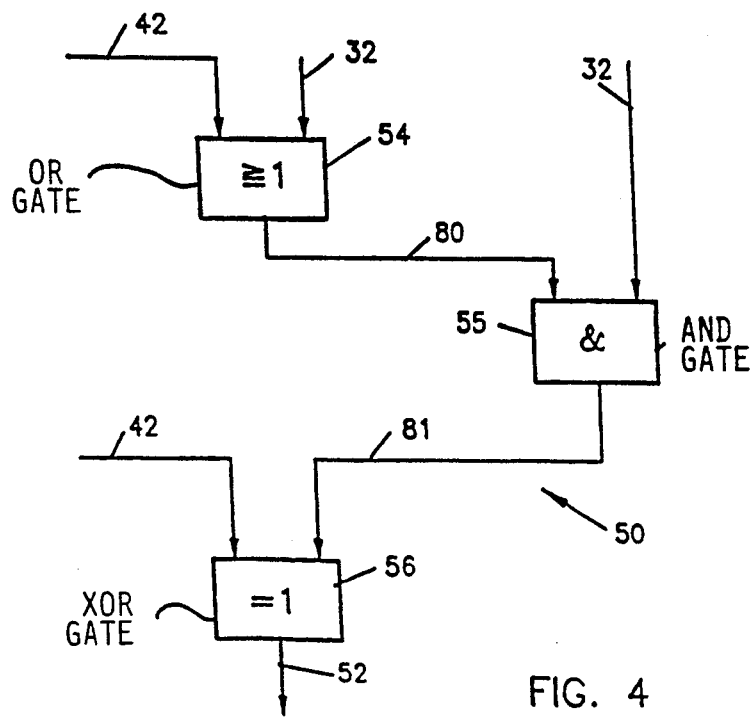
FIG. 4

INTEGRATED CIRCUIT CHIP WITH BUILT-IN SELF-TEST FOR LOGIC FAULT DETECTION

BACKGROUND OF THE INVENTION

The invention relates to an integrated circuit chip with built-in self-test for logic fault detection which comprises at least one combinational logic circuit.

Cordt W. Starke, "Design for testability and diagnosis in a VLSI CMOS System/370 processor", IBM Journal of Research and Development, Volume 34, Number 2/3, March/May 1990, pages 355 to 362, describes a design of combinational logic circuits which incorporates on-chip test pattern generation and on-chip test response evaluation for logic fault detection. In this paper, the combinational logic circuits are coupled together in a typical level-sensitive scan design (LSSD) by shift register latches (SRL's) which are configured to form test scan paths. The test patterns are generated by a linear feedback shift register (LFSR) which is configured as a pseudo-random pattern generator and which is implemented on the chip. To apply a test pattern, the shift register latches are loaded via the test scan paths. Then, the system clocks are pulsed once in order to execute one operational cycle of the system. After the system clocks have been applied, the test response is shifted out of the shift register latches via the test scan paths for further evaluation. However, the paper does not describe any weighting of the pseudo-random test patterns.

Robert W. Bassett et. al., "Low-cost testing of high-density logic components", "IEEE Design & Test of Computers", April 1990, pages 15 to 27, describes a weighted random pattern tester (WRPT) for combinational logic circuits with shift register latches (SRL's) and level-sensitive scan design (LSSD). The test patterns are generated by a linear feedback shift register (LFSR) and are then passed to a weight logic which is connected to a weight storage table. This table contains test weights for any shift register latch of the combinational logic circuit. The stored test weights are combined with the test patterns and are then applied to the shift register latches. Again, the system clocks are pulsed once and the test response is shifted out for evaluation and fault detection. Especially due to the weight storage table, the tester described in this paper requires substantially more hardware than an unweighted tester and therefore the tester cannot be placed on the chip.

It is an object of the invention to provide an integrated circuit chip with built-in self-test and weighted pseudo-random test patterns for logic fault detection.

SUMMARY OF THE INVENTION

In contrast to the prior art where the test weights are taken out of the weight storage table, the present invention generates the test weights with the help of a so-called "finite state machine" or "sequential machine", i.e. with a circuit which creates a finite number of test weights without storing them. Therefore, no weight storage table or the like is necessary and the whole tester can be incorporated on the chip.

Furthermore, as particular circuits, i.e. comparators or the like, are similar for different chips of a chip family, the same tester can be used on all these different chips, i.e. the configuration of the tester only depends on the chip family and not on the individual chip.

In embodiments of the invention, the test weights are generated by a shift register, especially by a linear feedback shift register, or by a counter register, for example a hexadecimal counter or the like. These registers work as the so-called "finite state machine" and are capable of providing the required test weights. The registers may run through all of their states or only through a subset of all possible states.

In another embodiment of the invention, the weight generation circuit comprises a number of bits which are about the same as the average width of all so-called "logic cones" of the chip. A "logic cone" is defined by all signals and all logic gates which influence one latch or one output of the combinational logic circuit. In this embodiment, the weight generation circuit generates weights for all signals of one logic cone. The same weights are also applied to all other logic cones of the chip. With the help of this strategy, the number of bits of the weight generation circuit is much smaller than the maximum number of shift register latches and therefore the necessary hardware for the weight generation circuit is reduced.

As an example, for a chip which has a general data and address bus width of 32 bits, the number of bits of the weight generation circuit is 40 which is equal to the average width of all logic cones of the chip.

In a further embodiment of the invention the weight generation circuit generates values of test weights which create weighted pseudo-random test patterns with an average percentage of binary "1" signals which is close to 0 percent or close to 100 percent. An investigation into test weights has shown that the values of 12.5 percent and 87.5 percent are advantageous.

In another embodiment, the weight generation circuit generates values of test weights which create weighted pseudo-random test patterns wherein a small part of the test pattern, e.g. 5 to 8 percent, have an average percentage of binary "1" signals which is close to 0 percent or close to 100 percent and wherein the rest of the test patterns have an average percentage of binary "1" signals which is about 50 percent.

In a further embodiment of the invention the weight generation circuit generates values of the test weights which create weighted test patterns for adjacent signals with the same average number of binary "1's" and "0's". This can be true for one or more test cycles. For further tests another average number of binary "1's" or "0's" are chosen. The number of adjacent signals with the same average number of binary "1's" or "0's" can be selected depending on the actual integrated circuit chip on which the tester is used.

The invention is not limited to use in level sensitive scan designs (LSSD). Furthermore, the invention can be used in connection with a logic circuit which does not include any latch or any scan path or the like. In this case, the weighted test pattern can be supplied to the logic circuit e.g. as usual inputs.

BRIEF DESCRIPTION OF THE DRAWING

FIGS. 3a and 3b show embodiments according to the invention for the weight generation circuit of FIG. 2.

FIG. 4 shows an embodiment according to the invention for the weighting circuit of FIG. 2.

DETAILED DESCRIPTION OF THE INVENTION

Figure 1:
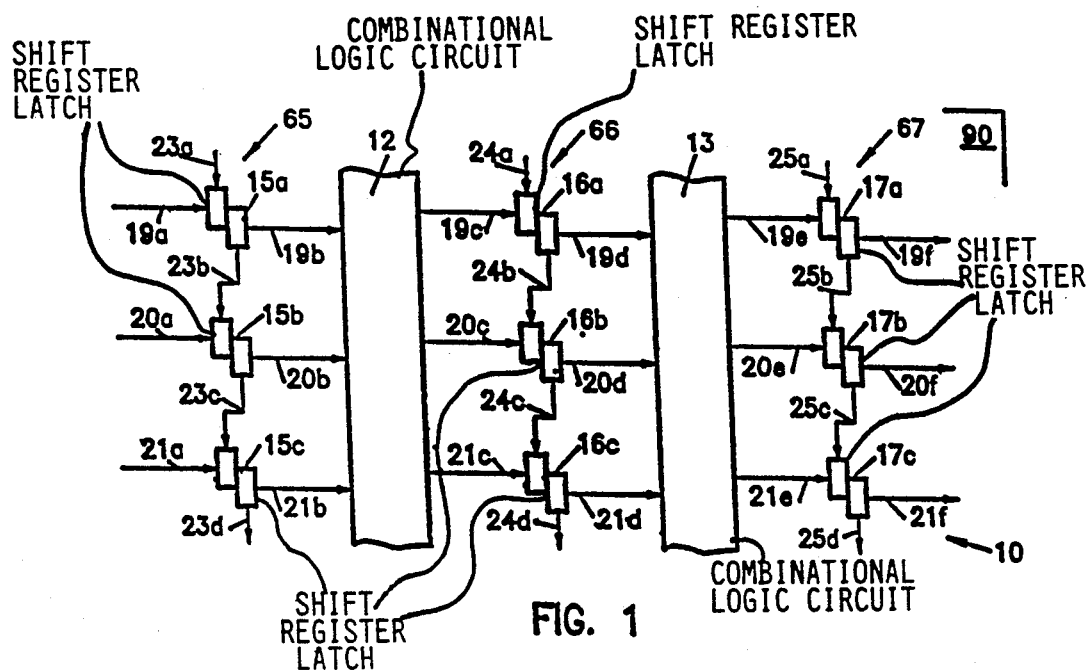
FIG. 1 shows a part of an integrated circuit chip to which the invention is applicable.

Embodiments of the invention will now be described in detail with reference to the drawing. The circuits and components shown in FIG. 1 are a part 10 of an integrated circuit chip 90 which in its entirety forms a processing unit or a control unit or the like of a digital computer system. The integrated circuit chip 90 is built in a very large scale integration (VLSI) technology and is designed according to level-sensitive scan design (LSSD) rules.

The part 10 of the integrated circuit chip 90, shown in FIG. 1, comprises a number of combinational logic circuits 12, 13 and a number of shift register latches 15a, 15b, 15c, 16a, 16b, 16c, 17a, 17b, 17c. The combinational logic circuits 12, 13 include AND-gates, OR-gates, etc. but no storing components. The shift register latches 15a, 15b, 15c, 16a, 16b, 16c, 17a, 17b, 17c are double-latches, which means they are able to store a bit and to receive another bit at the same moment.

The shift register latches 15a, 15b, 15c, 16a, 16b, 16c, 17a, 17b, 17c are connected to the combinational logical circuits 12, 13 via data lines 19a, 19b, 19c, 19d, 19e, 19f, 20a, 20b, 20c, 20d, 20e, 20f, 21a, 21b, 21c, 21d, 21e, 21f. All shift register latches 15a, 15b, 15c, 16a, 16b, 16c, 17a, 17b, 17c are provided with inputs for a system clock which are not shown in FIG. 1.

In normal operation, the integrated circuit chip 90 is clocked by the system clock. With every pulse of the system clock, all bits which are stored in the shift register latches 15a, 15b, 15c, 16a, 16b, 16c, 17a, 17b, 17c, leave these shift register latches 15a, 15b, 15c, 16a, 16b, 16c, 17a, 17b, 17c, for the combinational logic circuits 12, 3, pass through these combinational logic circuits 12, 13 and are then received and stored by the next consecutive one of the shift register latches 15a, 15b, 15c, 16a, 16b, 16c, 17a, 17b, 17c. When passing through the combinational logic circuits 12, 13 the respective bits are changed as a part of the function of the integrated circuit chip 90, e.g. as a part of an add function or the like.

As an example, a bit which is available on the data line 20a is stored in the shift register latch 15b and passed via the data lines 20b, 20c through the combinational logic circuit 12 after a first system clock. Then the bit which has possibly been changed is received by the next consecutive shift register latch 16b. With the next consecutive system clock, the bit is stored in the shift register latch 16b and passed via the data lines 20d, 20e through the next consecutive combinational logic circuit 13. The bit which again has possibly been changed is then received by the next consecutive shift register latch 17b, and so on.

The shift register latches 15a, 15b, 15c, 16a, 16b, 16c, 17a, 17b, 17c are connected to each other via test lines 23a, 23b, 23c, 23d, 24a, 24b, 24c, 24d, 25a, 25b, 25c, 25d. The shift register latches 15a, 15b, 15c and the test lines 23a, 23b, 23c, 23d form a test scan path 65. The same is true for the shift register latches 16a, 16b, 16c, 17a, 17b, 17c and the test lines 24a, 24b, 24c, 24d, 25a, 25b, 25c, 25d which form further test scan paths 66, 67. All shift register latches 15a, 15b, 15c, 16a, 16b, 16c, 17a, 17b, 17c are provided with inputs for a test clock which are not shown in FIG. 1.

In test operation, the integrated circuit chip 90 is first clocked by the test clock. With every pulse scan paths 65, 66, 67 from one of the shift register latches 15a, 15b, 15c, 16a, 16b, 16c, 17a, 17b, 17c to the next consecutive ones and are stored therein. When all the shift register latches 15a, 15b, 15c, 16a, 16b, 16c, 17a, 17b, 17c of the test scan paths 65, 66, 67 have received and stored a respective bit, one pulse of the system clock is executed. As already described, the bits which are stored in the shift register latches 15a, 15b, 15c, 16a, 16b, 16c, 17a, 17b, 17c are passed via the data lines 19a, 19b, 19c, 19d, 19e, 19f, 20a, 20b, 20c, 20d, 20e, 20f, 21a, 21b, 21c, 21d, 21e, 21f through the combinational logic circuits 12, 13 and are received and stored in the next consecutive shift register latches 15a, 15b, 15c, 16a, 16b, 16c, 17a, 17b, 17c. The received bits which have possibly been changed are then shifted out along the test scan paths 65, 66, 67 by a number of pulses of the test clock.

As an example, a bit which is available on the test line 24a is shifted along the test scan path 66 with two pulses of the test clock via the shift register latch 16a and the test line 24b to the shift register latch 16b and is stored therein. Then, with the following pulse of the system clock, the bit is passed through the combinational logic circuit 13 via the data lines 20d, 20e and is received and stored in the next consecutive shift register latch 17b. From there, the bit which has possibly been changed is shifted out along the test scan path 67 via the test lines 25c, 25d and the shift register latch 17c with two pulses of the test clock.

Figure 2:
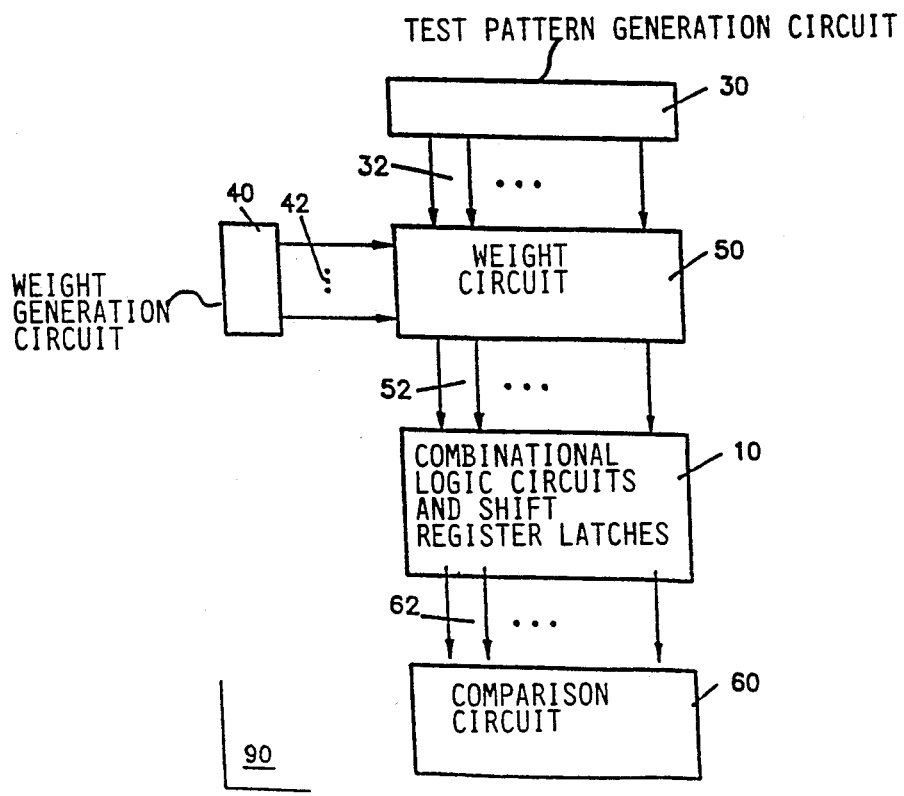
FIG. 2 shows the whole integrated circuit chip according to the invention with built-in self-test for logic fault detection.

The part 10 of the integrated circuit chip 90 which is described above in connection with FIG. 1 is shown again in FIG. 2. There, it is coupled with further circuits which are all placed on the integrated circuit chip 90. These further circuits are described in general in connection with FIG. 2 and then in detail in connection with FIGS. 3a, 3b, and 4.

In FIG. 2, a test pattern generation circuit 30 is shown, which is connected via lines 32 with a weighting circuit 50. A weight generation circuit 40 is also connected with the weighting circuit 50 via lines 42. Via lines 52, the weighting circuit 50 is connected to the part 10 of the integrated circuit chip 90, and via lines 62 this part 10 is connected with a comparison circuit 60. The lines 52 are coupled with the test lines 23a, 24a, 25a and the lines 62 are coupled with the test lines 23d, 24d, 25d of the part 10 of the integrated circuit chip 90.

The number of the lines 52, 62 which connect the weighting circuit 50, the part 10 of the integrated circuit chip 90 and the comparison circuit 60, depends on the number of test scan paths 65, 66, 67 which are established on the integrated circuit chip 90. The number of the lines 32 which connect the test pattern generation circuit 30 and the weighting circuit 50 depends on the number of bits of the test pattern generation circuit 30 and is in general greater than the number of the aforementioned lines 52, 62.

The test pattern generation circuit 30 comprises a linear feedback shift register which has a number of bits, i.e. a number of latches which is about twice the number of test scan paths 65, 66, 67 in the integrated circuit chip 90. This linear feedback shift register is designed such that all possible combinations of output bits are generated at least once; only a combination with all output bits being "0" is not generated.

FIGS. 3a and 3b show two embodiments of the weight generation circuit 40.

FIG. 3a shows a linear feedback shift register which comprises a shift register 44 which has N bit positions 1 to N. Every bit position 1 to N is connected with one of the lines 42. The bit position 1 and at least one more bit position, e.g. the bit position 27, are connected with feedback lines 76, 77 which are combined with the help of a connection point 75, e.g. an XOR gate, and which are then continued by a line 78 to the bit position N of the shift register 44.

The number of bits, i.e. the number of latches of the shift register 44 depends on the average width of all so-called "logic cones" of the integrated circuit chip 90. A "logic cone" is defined by all signals and all logic gates which influence one of the shift register latches 15a, 15b, 15c, 16a, 16b, 16c, 17a, 17b, 17c or one of the outputs or inputs e.g. of the integrated circuit chip 90. For example, the average width of all logic cones of a 32 bit computer system is about forty, so that in this case the number of bits, i.e. the number of latches of the shift register 44 is selected to be forty. The number of lines 42 for connecting the weight generation circuit 40 and the weighting circuit 50 corresponds to the number of bits of the shift register 44.

The linear feedback shift register shown in FIG. 3a is designed such that it runs through all possible combinations of output bits at least once; only a combination with all output bits being "0" is not generated. Therefore, the linear feedback shift register shown in FIG. 3a is a so-called "finite state machine" or "sequential machine", i.e. a generator which generates a finite number of combinations of output bits.

If an AND gate is used as the selection point 75 in FIG. 3a, then the linear feedback shift register shown in FIG. 3a does not necessarily run through all possible combinations of output bits, but only through a subset of all possible states. However, the linear feedback shift register is also a finite state machine in this case as it generates a finite number of combinations of output bits.

FIG. 3b shows a digital counter, e.g. a hexadecimal counter and comprises a counter register 46 which has N bit positions 1 to N. Every bit position 1 to N is connected with one of the lines 42. The bit position N is connected with an incrementer 70 via a line 71. With the help of the incrementer 70 the digital value of the counter register 46 is consecutively incremented by one.

The number of bits, i.e. the number of latches of the counter register 46 depends on the above mentioned average width of all logic cones of the chip 90. The number of lines 42 for connecting the weight generation circuit 40 and the weighting circuit 50 corresponds to the number of bits of the counter register 46.

The digital counter shown in FIG. 3b runs through all possible combinations of output bits by being incremented by the incrementer 70. Therefore, the digital counter shown in FIG. 3b is a finite state machine as mentioned above.

FIG. 4 shows an embodiment of the weighting circuit 50. Two of the lines 32 which connect the test pattern generation circuit 30 to the weighting circuit 50, two of the lines 42 which connect the weight generation circuit 40 to the weighting circuit 50, and one of the lines 52 which connects the weighting circuit 50 to the part 10 of the integrated circuit chip 90 are shown in FIG. 4. An OR gate 54 which has an output line 80, an AND gate 55 which has an output line 81 and an XOR gate 56 are provided in the weighting circuit 50.

The inputs of the OR gate 54 are connected with one of the two lines 32 and one of the two lines 42. The inputs of the AND gate 55 are connected with the output line 80 of the OR gate 54 and the other one of the two lines 32. The inputs of the XOR gate 56 are connected with the output line 81 of the AND gate 55 and the other one of the two lines 42. The output of the XOR gate 56 is connected with the line 52.

A configuration as shown in FIG. 4 is provided for all lines 32, 42, 52 in a similar manner.

The comparison circuit 60 comprises means for comparing the resulting test patterns which are available on lines 62 with desired test patterns which have to be calculated by simulating the circuits under test. If there is a difference, the integrated circuit chip 90 contains a logical fault.

The test pattern generation circuit 30 generates test patterns which are distributed in a pseudo-random manner. The weight generation circuit 40 generates test weights which depend on the content of the shift register 44 or the counter register 46. In the weighting circuit 50, the test patterns and the test weights are combined and weighted test patterns are created. With the help of the test weights it is possible to influence the test patterns and to create weighted test patterns with a distinct average percentage of bits with a binary "1" signal.

As an example, if the lines 42 carry "0" signals and if the lines 32 carry consecutively all possible combinations which are "0,0", "0,1", "1,0" and "1,1", then the output line 81 of the AND gate 55 carries three times a "0" signal and once a "1" signal. This means that the average possibility of a "1" signal is 25 percent in this case. However, if the line 42 which is connected to the OR gate 54 carries a "1" signal and if the lines 32 carry the above mentioned combinations, then the output line 81 of the AND gate 55 carries twice a "0" signal and twice a "1" signal. This means that the average possibility of a "1" signal in this case is 50 percent.

With the help of the signal on the line 42 which is connected with the XOR gate 56 it is possible to negate the signal on the output line 81 of the AND gate 55. If the line 42 which is connected with the XOR gate 56 carries a "1" signal, then any signal on the output line 81 of the AND gate 55 is turned into its opposite signal, i.e. a "1" signal is turned into a "0" signal and vice versa. This opposite signal is then output on line 52 which is the output line of the XOR gate 56.

In FIG. 4, the AND gate 55 has two input lines. It is possible to use AND gates with three or more input lines. In these cases, the average percentage of bits with a binary "1" signal on the output lines of these AND gates can be influenced in a more detailed manner. For example, with an AND gate with three input lines the average percentage of bits with a binary "1" signal on its output line can be influenced in steps of 12.5 percent.

Tests with the integrated circuit chip 90 as described have shown that good results can be obtained when the average percentage of bits with a binary "1" signal in the weighted test pattern is 12.5 percent or 87.5 percent.

Good results can also be obtained when about 5 to 8 percent of all test patterns have an average percentage of binary "1" signals which is close to 0 percent or close to 100 percent and when the rest of the test patterns have an average percentage of binary "1" signals which is about 50 percent.

Further evaluations have shown that good results can be obtained when weighted test patterns for adjacent signals with the same average number of binary "1"s or "0"s are applied. In this context adjacent signals are the signals 19b, 20b, 21b, 19d, 20d, 21d, 19f, 20f, 21f in FIG. 1. This number of adjacent binary "1" or binary "0" signals can be used for one or more consecutive test cycles and can then be changed for some more consecutive test cycles, and so on.

These adjacent binary "1" signals or binary "0" signals can be generated especially with the help of a weight generation circuit 40 which does not run through all possible combinations of created output bits as described in connection with FIG. 3a.

We claim:

1. An integrated circuit chip with built-in self-test for logic fault detection comprising:
   at least one combinational logic circuit;
   a pattern generation circuit for generating test patterns;
   a weight generation circuit including a finite state machine for generating test weights; and
   a weighting circuit, said weighting circuit being coupled to said pattern generation circuit, said weight generation circuit and said combinational logic circuit for combining said test patterns and said test weights to create weighted test patterns for suppling to said combinational logic circuit.

2. The integrated circuit chip according to claim 1 wherein said weight generation circuit comprises a shift register.

3. The integrated circuit chip according to claim 1 wherein said weight generation circuit comprises a counter register.

4. The integrated circuit chip according to claim 1 wherein said weight generation circuit comprises a number of bits which is about the same as the average width of all logic cones of the chip.

5. The integrated circuit chip according to claim 2 wherein said weight generation circuit comprises a number of bits which is about the same as the average width of all logic cones of the chip.

6. The integrated circuit chip according to claim 3 wherein said weight generation circuit comprises a number of bits which is about the same as the average width of all logic cones of the chip.

7. The integrated circuit chip according to claim 4, wherein said number of bits is 40.

8. The integrated circuit chip according to one of claim 1 wherein said weight generation circuit generates values of test weights which create weighted test patterns with an average percentage of binary "1" signals which is close to 0 percent or close to 100 percent.

9. The integrated circuit chip according to one of claim 2 wherein said weight generation circuit generates values of test weights which create weighted test patterns with an average percentage of binary "1" signals which is close to 0 percent or close to 100 percent.

10. The integrated circuit chip according to one of claim 3 wherein said weight generation circuit generates values of test weights which create weighted test patterns with an average percentage of binary "1" signals which is close to 0 percent or close to 100 percent.

11. The-integrated circuit chip according to claim 1 wherein said weight generation circuit generates values of test weights which create weighted test patterns with a part of said weighted test patterns having an average percentage of binary "1" signals which is close to 0 percent or close to 100 percent and with the rest of said weighted test patterns having an average percentage of binary "1" signals which is about 50 percent.

12. The integrated circuit chip according to claim 2 wherein said weight generation circuit generates values of test weights which create weighted test patterns with a part of said weighted test patterns having an average percentage of binary "1" signals which is close to 0 percent or close to 100 percent and with the rest of said weighted test patterns having an average percentage of binary "1" signals which is about 50 percent.

13. The integrated circuit chip according to claim 3 wherein said weight generation circuit generates values of test weights which create weighted test patterns with a part of said weighted test patterns having an average percentage of binary "1" signals which is close to 0 percent or close to 100 percent and with the rest of said weighted test patterns having an average percentage of binary "1" signals which is about 50 percent.

14. The integrated circuit chip according to claim 8 wherein said average percentage of binary "1" signals is 12.5 percent.

15. The integrated circuit chip according to claim 11 wherein said average percentage of binary "1" signals is 12.5 percent.

16. The integrated circuit chip according to claim 8 wherein said average percentage of binary "1" signals is 87.5 percent.

17. The integrated circuit chip according to claim 11 wherein said average percentage of binary "1" signals is 87.5 percent.

18. The integrated circuit chip according to claim 1 wherein said weight generation circuit generates values of test weights which create weighted test patterns for adjacent signals with the same average number of binary "1's" or "0's".

19. The Integrated circuit chip according to claim 1 wherein said pattern generation circuit and said weight generation circuit are combined in one finite state machine.

20. An integrated circuit chip with built-in self-test for logic fault detection, for use in a computer system comprising:
   at least one combinational logic circuit;
   a pattern generation circuit for generating test patterns;
   a weight generation circuit including a finite state machine for generating test weights; and
   a weighting circuit, said weighting circuit being coupled to said pattern generation circuit, said weight generation circuit and said combinational logic circuit for combining said test patterns and said test weights to create weighted test patterns for suppling to said combinational logic circuit.

* * * * *